United States Patent [19]

Baker

[11] Patent Number: 5,098,476
[45] Date of Patent: Mar. 24, 1992

United States Patent

[54] ADDITIVE TO AQUEOUS-BASED INKS TO IMPROVE PRINT QUALITY

[75] Inventor: Jeffrey P. Baker, San Diego, Calif.

[73] Assignee: Hewlett-Packard Company, Palo Alto, Calif.

[21] Appl. No.: 494,054

[22] Filed: Mar. 15, 1990

[51] Int. Cl.$^5$ .............................................. C09D 11/02
[52] U.S. Cl. ........................................ 106/22; 106/20
[58] Field of Search .................................... 106/20, 22

[56] References Cited

U.S. PATENT DOCUMENTS

| | | | |
|---|---|---|---|
| 4,153,593 | 5/1979 | Zabiak et al. | 106/22 |
| 4,170,482 | 10/1979 | Mansukhani | 106/20 |
| 4,184,881 | 1/1981 | Bradley | 106/22 |
| 4,196,007 | 4/1981 | Mansukhani | 106/22 |
| 4,256,493 | 3/1981 | Yokoyama et al. | 106/22 |
| 4,279,653 | 7/1981 | Makishima et al. | 106/22 |
| 4,295,889 | 10/1981 | Eida et al. | 106/22 |
| 4,299,630 | 11/1981 | Hwang | 106/22 |
| 4,567,213 | 1/1986 | Bhatia et al. | 106/22 |
| 4,661,158 | 4/1987 | Kobayashi et al. | 106/22 |
| 4,732,613 | 3/1988 | Shioya et al. | 106/22 |

FOREIGN PATENT DOCUMENTS 167775 12/1981 Japan .
18772 1/1982 Japan .

*Primary Examiner*—William R. Dixon, Jr.
*Assistant Examiner*—Helene Klemanski

[57] ABSTRACT

A method for improving the print quality of ink used in ink-jet printers, particularly thermal ink-jet printers, is provided. For an ink typically comprising about 90 to 98 wt % water and about 10 to 2 wt % diethylene glycol plus about 0.1 to 12 wt % dye, the improvement is achieved by adding an additive consisting essentially of about 1 to 30 wt % ethanol, about 1 to 30 wt % n-propanol, about 1 to 10 wt % iso-propanol, or about 0.002 to 0.05 wt % of 2,5,8,11-tetramethyl-6-dodecyn-5,8-diol.

4 Claims, No Drawings

ADDITIVE TO AQUEOUS-BASED INKS TO IMPROVE PRINT QUALITY

TECHNICAL FIELD

The present invention relates to ink compositions for ink-jet printers, particularly thermal ink-jet printers. Specifically, the present invention relates to a method of improving the print quality of aqueous-based inks.

BACKGROUND ART

Ink-jet printers are finding increasing use due to their high printing speed, compactness and light weight. Such printers commonly employ as the ink an aqueous-based vehicle in which a dye is dissolved. The vehicle typically comprises water and a water-miscible organic compound, such as diethylene glycol (DEG), propylene glycol, or pyrrolidone.

The printers employ a print cartridge, which includes a reservoir for storing ink and a printhead for ejecting droplets of ink toward a print medium, such as paper. The apparatus for ejecting the ink droplets is often referred to as a drop generator.

The drop generator comprises an entrance channel (through which ink from the reservoir enters), a resistor surface, a border around the perimeter of the resistor defined by barrier walls, and a nozzle plate (nickel) with a nozzle above the resistor surface at the top of the barrier walls.

During the course of operation, two types of bubbles may be formed, one of which is undesirable. Undesirable bubbles usually are very small (about 0.1X resistor size) and stable; they may adhere continuously to the surface of the resistor or the interior surface of the nozzle plate or float loose within the drop generator. The ejection of ink is caused by an electrical pulse to the resistor, which creates the desirable vapor bubble, which then ejects ink through the nozzle and toward the print medium. The vapor bubble, or droplet, is unstable (of short time duration) and is as large as the resistor itself.

Ink bubbles stuck to the barrier wall or nozzle plate surface of the drop generator cause a reduction in drop ejection energy and stability, and, therefore, print quality is degraded. The bubbles on or very near the resistor surface cause low temperature nucleation with unstable, non-repeatable ejection droplet formation. The bubbles elsewhere in the drop generator absorb the pressure energy (the bubbles are compressible) and reduce ejection velocity, drop volume, and jet performance.

The geometry of the drop generator and the alignment of the nozzle plate are difficult to control in a manufacturing environment. In addition, controlling or modifying the resistor surface to obtain stable nucleation has not been successful to date. These factors, together with the high ink surface tension, result in degradation of the print quality.

Accordingly, a method is needed to improve the print quality.

The present invention teaches the addition of a propanol or ethanol or defoaming agent to the ink. Alcohols have been added to inks for various reasons; see, e.g., Eida et al, U.S. Pat. No. 4,295,889. However, such additions were made to inks having comparatively low water content. This is to be compared to the vehicles used in the inks discussed herein, which have at least about 90% water and less than about 10% of the water-miscible organic compound.

DISCLOSURE OF INVENTION

In accordance with the invention, an additive is added to an aqueous-based ink in which the vehicle comprises at least about 90% water and less than about 10% water-miscible organic compound. The additive consists essentially of (i) an alcohol having two or three carbon atoms or (2) a defoaming agent. The amount of the alcohol added ranges from about 1 to 30 wt%. The amount of defoaming agent ranges from about 0.002 to 0.05 wt%. Such addition lowers the surface tension of the ink, giving rise to more stable vapor bubble formation. Consequently, more consistency is obtained from dot to dot of printed ink. Also, there is less force acting on the distorted fluid surface and less chance of entraining air bubbles. And, bubbles cannot stick as readily to the resistor surface, causing low temperature nucleation. As a result of the foregoing, print quality is enhanced.

BEST MODES FOR CARRYING OUT THE INVENTION

Ink compositions customarily comprise a vehicle and a dye. Other additives conventionally added to condition the ink or its interaction with the print medium (e.g., paper) may be provided. For example, polymers may be added to help control bubble formation of inks in thermal ink-jet printers. The polymer, typically present in an amount ranging from about 0.001 to 1 wt%, may comprise polyvinyl pyrrolidone, GAFquat 734, available from the GAF Corporation, Chemical Products (New York, NY), and a mixture of polyvinyl pyrrolidone and polyvinyl alcohol. Or, substances to improve the wettability of the ink on paper may be added. Such substances are typically present in an amount of about 0.01 wt%. Examples include Atlas G-263, available from Atlas Refinery, Inc. (Newark, NJ), and Fluororad, available from 3M Company (St. Paul, MN). The purity of the components employed in preparing the inks is that found in normal commercial practice.

In accordance with the invention, up to about 30 wt% of a low molecular weight alkyl alcohol comprising two or three carbon atoms is added to the ink composition. The addition of the alcohol has been found to reduce the surface tension and increase the surface wettability, causing very fast printhead startup and stable bubble nucleation and growth. Print quality is improved, due to formation of drops of more uniform size.

Also in accordance with the invention, from about 0.002 to 0.05 wt% of a surfactant/defoaming agent is added to the ink composition. The addition of the surfactant/defoaming agent provides the same benefits as the alcohol and also tends to inhibit hard crust formation at the nozzles. Such crust formation can affect droplet trajectory, thereby degrading print quality. Further, gas bubbles do not easily stick to the walls of the drop generator, thereby improving the reliability of drop ejection energy and stability. An example of a suitable surfactant/defoaming agent useful in the practice of the invention is SURFYNOL® DF-110S surfactant/defoamer, available from Air Products & Chemicals, Inc. (Allentown, PA). This material is 2,5,8,11-tetramethyl-6-dodecyn-5,8-diol.

Startup (first drops out of the printhead) is important for either a new pen on the assembly line (for quality control or process charting) or a wetted pen that has outgassed bubbles during storage. The more aggressive wetting and the lower surface tension allow the fluid to flow behind the trapped bubble, thus releasing it and allowing the ink flow to move it away (out the nozzle or up the channel where it cannot affect drop ejection).

The method of the invention allows the printhead fabrication process to use more lenient tolerances and fewer surface preparation operations. Surface preparations may include increasing the wettability of drop generator surfaces, such as additional coatings, plasma etch, vapor deposition, or stabilizing the nucleation process (methods of controlling sites of nucleation at a microscopic level).

The use of the additive of the invention not only improves the print quality at a given frequency, but also increases the frequency at which the printhead will operate within quality specifications. It has been found that adding n-propanol to the inks (for example, about 5 wt%) increases the frequency response of the printhead. Lowering the surface tension would seem to reduce the frequency response due to slower chamber refilling, but since the drops are smaller, the maximum operating limit is increased. If the drop volume needs to be increased for optical density requirements, the advantages of this effect may be reduced or nullified.

The additive of the invention has a drastic effect on surface tension. Water has a surface tension of 73 dynes/cm. The ink itself has a surface tension of approximately 68 dynes/cm. Alcohols have surface tensions in the range of about 20 to 25 dynes/cm; D-propanol has a surface tension of approximately 24 dynes/cm. Five percent D-propanol addition to the ink reduces the surface tension of the ink to about 45 dynes/cm, or about half the difference between the surface tension of the ink and that of D-propanol. The addition of 0.01 wt% of DF-110S also provides a surface tension of about 45 dynes/cm.

The alcohol may consist essentially of n-propanol, in which case the addition ranges from about 1 to 30 wt%. If greater than about 30 wt%, the ink is too volatile (flammable or causes crusting), the toxicity of the alcohol may become an issue, and the odor is unpleasant (and may cause headaches). Further, high amounts of n-propanol will result in an unacceptably low surface tension. If the surface tension is too low, the printhead may fail due to the lack of ink reservoir design margin. The reservoir delivers the ink to the printhead with a slight negative pressure to prevent bleeding or drooling of the ink at the nozzles. The surface tension prevents the nozzles from depriming (air being drawn into the drop generators) during shock and/or vibration. Also, low surface tension allows the ink to wick across the nozzle plate and cause print quality errors by misdirecting the ink drop trajectory. The preferred amount of n-propanol ranges from about 1 to 6 wt%.

The alcohol additive may alternatively consist essentially of iso-propanol, ranging in amount from about 1 to 10 wt%. Since the vapor pressure of iso-propanol is higher (cruising at the orifices) and the dye solubility is lower (dye precipitation) than n-propanol, the preferred amount of iso-propanol ranges from about 1 to 5 wt%. Due to toxicity considerations, iso-propanol is preferred over n-propanol.

Finally, the alcohol additive may consist essentially of ethanol, added in the same amounts as n-propanol, with essentially the same result.

The amount of the defoaming agent, as indicated above, ranges from about 0.002 to 0.05 wt%. The minimum value provides a decrease of at least about 10 to 15% in surface tension over the water/glycol vehicle. The maximum value is constrained by the solubility of the defoaming agent in the ink. Preferably, the defoaming agent, if present, is about 0.01 wt% of the ink composition.

The vehicle of the ink which is benefitted by the teachings of the invention comprises at least about 90 wt% water, the balance a water-miscible organic compound such as diethylene glycol, propylene glycol, or 2-pyrrolidone. When the defoaming agent is present, the amount of water must be at least about 95 wt% in order to provide better start-up with no crusting of the ink around the nozzles. In any event, the maximum amount of water is about 98 wt%, which is the practical limit due to its vapor pressure and rapid evaporation, causing crusting.

The glycol may comprise any of the lower molecular weight glycols, such as ethylene glycol, diethylene glycol, triethylene glycol, tetraethylene glycol and propylene glycol. Preferably, diethylene glycol (DEG) is employed as the glycol.

The additive of the invention is added to the existing ink. For example, after a dye-water combination is subjected to reverse osmosis and possibly ion exchange for purification and cation substitution, water and the organic compound are added in sufficient amounts to produce the desired ink, such as an ink in which the vehicle comprises 95% water and 5% DEG. A biocide is added, as appropriate. To this ink is then added sufficient additive to achieve the desired concentration, for example, 5% D-propanol or 0.01 wt% DF-110S.

The dye may comprise any of the dyes commonly employed in ink-jet printers, such as dyes having sulfonate or carboxylate groups. An example of such a dye is Food Black 2. Other examples of suitable dyes include Mobay Special Direct Black Liquid (SP) and infrared inks used in bar code readable applications.

The dye is present in a range of about 0.1 to 12 wt%. Less than about 0.1% results in poor print quality, while greater than about 12% results in precipitation of the dye.

Advantageously, crusting of the printhead orifices (a problem with present commercial inks) is not a problem with the ink compositions of the invention. Also, kogation (a coined term unique to thermal ink-jet printing, which describes the decomposition of the dye in the ink resulting from heating the ink to a high temperature by the hot resistors used to "fire" droplets of ink toward the paper substrate) does not appear to be made any worse by the presence of the additive.

INDUSTRIAL APPLICABILITY

The ink composition of the invention is suitably employed in ink-jet printers, particularly thermal ink-jet printers.

EXAMPLES

An ink was made by dissolving 12 wt% dye (Food Black 2) in water. The solution was subjected to reverse osmosis. Diethylene glycol was added, together with water and a small amount (0.3 wt%) of Nuosept C biocide (available from Nuodex, Inc., Piscataway, NJ) to form the desired ration of 95/5 water/DEG. The surface tension of the ink was approximately 68 dynes/cm.

To the foregoing ink was added n-propanol. Various mixtures were prepared, having 1, 2, 3, 4, and 5 wt% of the alcohol. The surface tensions of the inks were approximately 60, 55, 51, 48, and 45 dynes/cm, respectively.

An ink having 5 wt% n-propanol addition evidenced, at higher frequencies approaching 6 kHz, small uniform drops, providing a more event print quality. An ink comprising the same vehicle and dye, without the additive, evidenced non-uniform size drops and a grainy appearance.

Similar results are obtained for inks comprising about 95 wt% water and the balance DEG, with about 12 wt% dye, and containing about 5 wt% iso-propanol or ethanol or about 0.01 wt% 2,5,8,11-tetramethyl-6-dodecyn-5,8-diol.

Thus, a method for improving the print quality of inks employed in thermal ink-jet printing is improved. Various changes and modifications may be made by those skilled in the art without departing from the spirit and scope of the invention, and all such changes and modifications are considered to be within the scope of the appended claims.

What is claimed is:

1. A thermal ink-jet composition having a surface tension in the range of about 45 to 60 dyne/cm, substantially uniform drop size, and capable of operating at printer frequencies approaching 6 kHz, consisting essentially of (a) an additive selected from the group consisting of about 1 to 6 wt% of ethanol, about 1 to 6 wt% of n-propanol, about 1 to 5 wt% of iso-propanol, and about 0.002 to 0.05 wt% of 2,5,8,11-tetramethyl-6-dodecyn-5,8-diol, (b) about 0.1 to 12 wt% of a dye, and (c) a vehicle consisting essentially of about 90 to 90% water and the balance a water-miscible organic compound selected from the group consisting of diethylene glycol, propylene glycol, and 2-pyrrolidone.

2. The ink composition of claim 1 wherein the concentration of said 2,5,8,11-tetramethyl-6-dodecyn-5,8-diol is about 0.01 wt%.

3. In a method of printing from a thermal ink-jet printer onto a medium, wherein an ink is jetted from a pen mounted on said printer, the improvement comprising employing as the ink a composition comprising (a) an additive selected from the group consisting of about 1 to 6 wt% of ethanol, about 1 to 6 wt% of n-propanol, about 1 to 5 wt% of iso-propanol, and about 0.002 to 0.05 wt% of 2,5,8,11-tetramethyl-6-dodecyn-5,8-diol, (b) about 0.1 to 12 wt% of a dye, and (c) a vehicle consisting essentially of about 90 to 98% water and the balance a water-miscible organic compound selected from the group consisting of diethylene glycol, propylene glycol, and 2-pyrrolidone.

4. In the method of claim 3 wherein the concentration of said 2,5,8,11-tetramethyl-6-dodecyn-5,8-diol is about 0.1 wt%.

* * * * *